United States Patent [19]

Remsburg

[11] Patent Number: 4,886,301
[45] Date of Patent: Dec. 12, 1989

[54] QUICK DISCONNECT WITH A POSITION COMPENSATING SEAL

[75] Inventor: Ralph Remsburg, Irvine, Calif.
[73] Assignee: Preece Incorporated, Irvine, Calif.
[21] Appl. No.: 190,335
[22] Filed: May 5, 1988
[51] Int. Cl.[4] .............................................. F16L 35/00
[52] U.S. Cl. ...................................... 285/39; 277/98; 277/206 R; 285/223
[58] Field of Search .................. 285/27, 223, 225, 226, 285/267; 277/97, 98, 206 R

[56] References Cited

U.S. PATENT DOCUMENTS

| | | | |
|---|---|---|---|
| 2,531,020 | 11/1950 | Bard | 285/267 |
| 2,964,343 | 12/1960 | Klingler | 277/206 X |
| 3,575,432 | 4/1971 | Taylor | 277/206 R X |
| 3,761,102 | 9/1923 | Nicholson | 277/206 R |
| 3,841,718 | 10/1974 | Reinsma | 277/206 X |
| 4,239,242 | 12/1980 | Burns | 277/206 R X |
| 4,611,829 | 9/1986 | Hughes | 285/27 X |

FOREIGN PATENT DOCUMENTS 675242 8/1979 U.S.S.R. ........................ 277/206 R

Primary Examiner—Peter R. Brown
Attorney, Agent, or Firm—Leonard Tachner

[57] ABSTRACT

A novel quick disconnect, the nipple portion of which is provided with a unique spring seal comprising a retainer and a plurality of Belleville springs contained within an annular pocket within the retainer. The nipple is provided with a body having a flanged portion which floats on the spring seal relative to an annular chamber within the wrench portion of the threaded member of the nipple. In addition, the wrench portion of the corresponding coupler is chamfered in order to automatically adjust the nipple body despite misalignment of radial, angular and axial type, thereby permitting secure leak-proof interconnection of the quick disconnect members. Such capability is especially useful in accommodating coolant fluid flow through a plurality of serially interconnected electrical chasses wherein misalignment of quick disconnect flow connectors cannot be readily accommodated by manual adjustment means and must be accommodated by automatic adjustment of the quick disconnect components.

6 Claims, 5 Drawing Sheets

QUICK DISCONNECT WITH A POSITION COMPENSATING SEAL

BACKGROUND OF THE INVENTION

1. Field of the Invention

The present invention relates generally to quick disconnects and more specifically to a quick disconnect having a spring seal which compensates for misalignment between the female and male connectors thereof to permit interconnection therebetween even when there is radial, axial and angular misalignment of the male member relative to the female member.

2. Prior Art

Quick disconnects are well-known in the art. They are commonly used to interconnect one flexible pipe to another flexible pipe, both of which pipes are adapted for the flow of a fluid therethrough. The term "pipe" as used herein means any type of fitting, hose, boss, etc., to which a quick disconnect may be attached. The term "quick disconnect" is derived from the performance characteristics of this type of connector. More specifically, a quick disconnect is adapted to permit disconnection of the two fluid carrying pips with a self-sealing feature designed so that little or no quantities of the fluid escape the connectors upon disconnection. Furthermore, the process of disconecting the two pipes can be implemented by simple mechanical release thereof without the necessity for disconnecting or unfastening a plurality of conventional fastening elements such as bolts and the like.

Virtually all quick disconnects comprise two major members called a "coupler" and a "nipple", respectively. Each such member is designed to mate with the corresponding fluid carrying pipe and then to be mated with each other so that the respective pipes can be interconnected. The nipple may be regarded as the male member in that it slides into the coupler. Typically, the nipple comprises a spring loaded poppet and the coupler comprises a stationary stem. When the coupler and nipple are mated, the coupler stem is designed to engage the nipple poppet, pushing it away from the interface of the two members whereby to permit fluid flow around the poppet of the nipple as will be hereinafter more fully described. In addition, when the two members are interconnected, the nipple body slides into the coupler body so as to depress a spring loaded cylinder called the coupler poppet, the depression of which allows fluid flow through the coupler as well. In order to interconnect the coupler and nipple portions of the quick disconnect it is generally necessary of axially align the two members relative to one another.

When the coupler and nipple members of a quick disconnect are connected to flexible hoses readily accessible for being manually aligned relative to one another, there is generally no difficulty in assuring that the two members are axially configured relative to one another to provide easy interconnection therebetween. However, there are occasions when it is difficult or impossible to accurately control the axial position of the coupler and nipple relative to one another to assure that they are perfectly aligned to facilitate their easy interconnection. One such example of inaccessibility of alignment arises when the respective members of a quick disconnect are mounted to boxes or chassis such as those which contain electrical equipment which, for example, are to be panel mounted. Such a configuration may, for example, be encountered in the avionics equipment bay of an aircraft where electrical equipment requires fluid coolant to dissipate relatively high levels of power. In such situations, one or more couplers of quick disconnects may be mounted to one piece of electrical equipment and one or more nipples of quick disconnects may be mounted to a second piece of electrical equipment. Such quick disconnects may be provided to permit the flow of a cooling fluid between such electrical equipment so that one source of cooled fluid may be used to circulate among a plurality of electrical equipment chassis in order to carry away the heat generated by the power dissipation of such electrical equipment.

Precise axial alignment of the mating coupler and nipple portions of each quick disconnect in such configurations may be very difficult. Such difficulty may arise because the quick disconnect members are not accurately positioned on the electrical chassis so that one such member is displaced axially, radially and angularly with respect to the other. Conventional quick disconnect members which require virtually precise axial alignment of the coupler and nipple for mating and proper sealing of the quick disconnect, may make it virtually impossible to overcome such difficulties thereby requiring more expensive accurate placement of the quick disconnect members on the respective electrical equipment chassis. This is particularly true where one or both such electrical chassis to be mated to another, is mechanically constrained so that it is impossible to adjust the overall position of the electrical equipment chassis to compensate for the inaccurate alignment of the quick disconnect members.

The following U.S. Pat. Nos. are relavant to the present invention:

3,532,350 Kaufman
4,023,831 Thompson
4,116,451 Nixon et al
4,160,551 Nixon et al
4,191,389 Jelinek
4,196,913 Oak
4,387,902 Conover
4,470,608 Warren
4,599,171 Padilla et al
4,657,188 Crane et al U.S. Pat. No. 4,657,188 to Crane et al is directed to a spray system for a dishwashing machine having an inlet conduit adapted for insertion into a supply conduit to connect a spray manifold to the supply. The lower end of manifold includes an inlet conduit having an open end which is insertable within open end of branch conduit, having a widened mouth formed about open end. A sealing O-ring is disposed within a groove about open end of inlet conduit, forming a fluid tight seal upon insertion of open end into open end.

U.S. Pat. No. 4,023,831 to Thompson is directed to a plastic pipe fitting having a telescoping member. A tubular member extends axially outwardly from coupling member, which includes a pair of O-ring seals located within annular grooves, within coupling member. The end of tubular member, disposed within coupling member, is provided with a ring member secured by fusion bonding to the outer surface of tubular member. However, ring member is not an end seal, but is adapted to limit the extent of axial movement of tubular member outwardly from coupling member.

U.S. Pat. No. 3,532,350 to Kaufman is directed to a composite seal comprising an annular ring of resilient material and having springs embedded therein. The annular packing ring comprises resilient material, such as rubber or plastic, and a plurality of coil springs disposed centrally within. These springs reinforce the biasing effect of the packing member. In another embodiment, a U or V-shaped spring is embedded within packing ring and includes outwardly extending fingers or may be continuous as provided with spring shown in FIGS. 7 and 8.

U.S. Pat. No. 4,196,913 to Oka is directed to a gasket having a construction wherein an undulating base plate is located intermediate a pair of surface plates. The base plate is provided with undulations surrounding holes in the gasket to impart elasticity to the base plate, as is similarly done in the present invention using Bellevile spring washers. The surface plates are metallic in nature and may be slightly softer than the base plate, as this gasket is intended for use as a cylinder head gasket.

U.S. Pat. No. 4,470,608 to Warren is directed to a resilient gasket having an internally an internally positioned spring means. The flexible resilient gasket is shown to include a metal spring means. The spring means is formed by a pair of elongate strip of spring steel which are curved along their length, with the concave surfaces facing each other.

There is therefore a need for a quick disconnect member which is designed to permit axial, radial and angular misalignment between the male and female members of the quick disconnect while still providing a secure and leak-proof interconnection therebetween.

SUMMARY OF THE INVENTION

The present invention solves the aforementioned need by providing a quick disconnect nipple or male member which is designed to permit the body portion thereof to be at least initially misaligned axially, radially and angularly with respect to the interfacing coupler or female member whereby a secure leak-proof interconnection therebetween is possible despite the aforementioned initial misalignment. More specifically, the present invention comprises an improved quick disconnect nipple member which utilizes a novel spring seal having a retainer forming an annular pocket and receiving a plurlaity of Belleville springs. This seal is positioned between the nipple body and the adjacent threaded member of the nipple. More particularly, the seal is positioned between a flange portion of the nipple body and the wrench portion of the nipple threaded member, the inner diameter of the latter being larger than the outer diameter of the former. This positioning permits the nipple body to mechanically float on the aforementioned spring seal and to move axially, radially and angularly with respect to the threaded member of the nipple which is affixed to the electrical chassis to which the quick disconnect is mounted.

The retainer or seal body portion of the spring seal is preferably made of a relatively resilient material such as rubber or rubber-like compounds of selectable degree of hardness. The interface between such rubber-like material retainer and the adjacent metal surfaces prevents fluid flow therearound, effectively seals the adjustable nipple body despite variation in its axial, radial or angular orientation relative to the threaded member portion of the nipple. The plurality of Belleville springs gives the spring seal the ability to bend and flex to the degree required to reorient the nipple body for alignment with the female portion of the quick disconnect on an adjoining electrical chassis, but without distorting the surface of the seal body holding the Belleville springs to the extent that a leak would otherwise develop.

OBJECTS OF THE INVENTION

It is therefore a principal object of the present invention to provide an improved quick disconnect having at least one member designed to permit secure leak-proof interconnection of the quick disconnect members despite an initial misalignment of one such member relative to the other in axial, radial and angular orientation.

It is an additional object of the present invention to provide an improved quick disconnect, the nipple portion thereof having an adjustable body which can be reoriented axially, radially, and angularly with respect to the fixed threaded portion of the nipple to permit interconnection between the nipple and coupler portions of the quick disconnect despite initial relative misalignment therebetween.

It is still an additional object of the present invention to provide an improved quick disconnect which utilizes a novel spring seal comprising a resilient retainer forming an annular pocket into which is positioned a plurality of Belleville springs, such spring seal being positioned between the nipple body and the nipple threaded member to permit the body portion to float with respect to the seal for adjustment in axial, radial and angular directions relative to the coupler portion of the quick disconnect for interconnection therewith despite initial misalignment therebetween.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment of the invention when taken in conjunction with the following drawings in which.

DETAILED DESCRIPTION OF A PREFERRED EMBODIMENT

Figure 1:
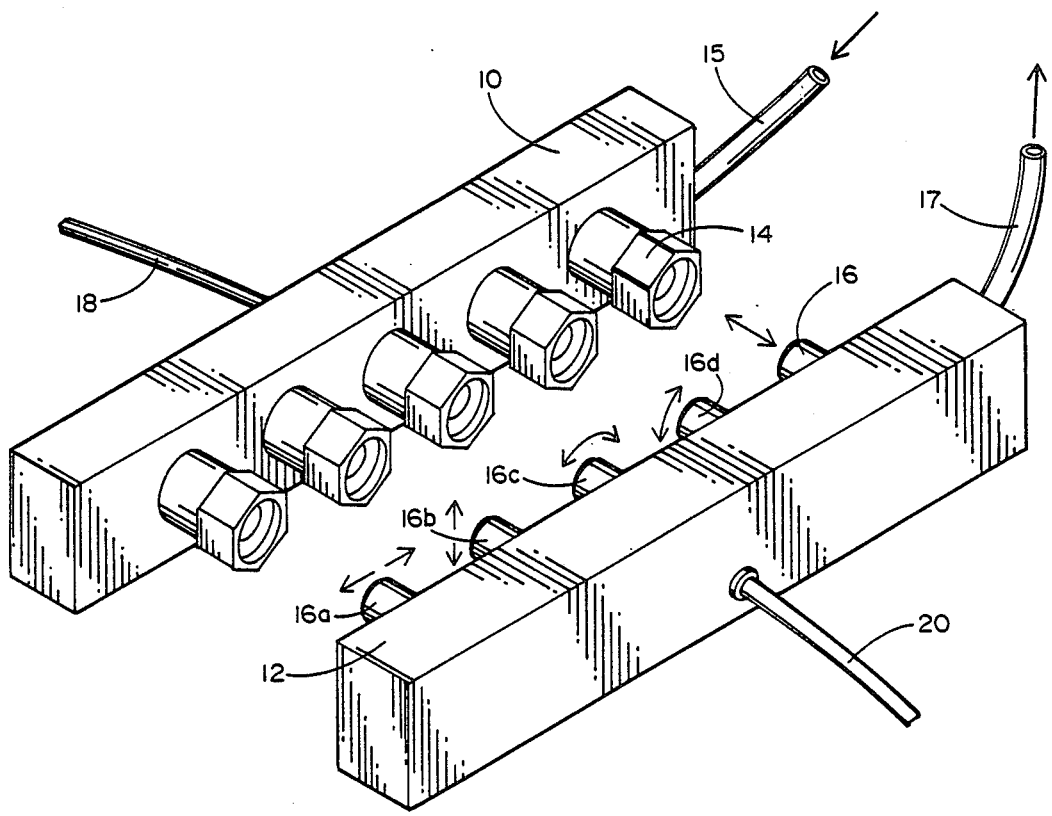
FIG. 1 is an isometric view providing an illustrative example of two electrical equipment chassis designed to be interconnected by a plurality of quick disconnects for the passage of fluid flow therebetween.

Referring now to FIG. 1, there is shown therein a first equipment chassis 10 and a second equipment chassis 12. Chassis 10 is provided with a plurality of quick disconnect couplers 14 which are of the female-type and chassis 12 is provided with a plurality of quick disconnect nipples 16 which are of the male-type. Electrical wiring harnesses 18 and 20 provide electrical interconnection to chassis 10 and 12, respectively, while fluid hoses 15 and 17 provide fluid input to chassis 10 and fluid output from chassis 12, respectively. It will be understood that FIG. 1 is of an illustrative nature only, that is, it illustrates one example of two electrical chassis adapted for interconnection for fluid flow therebetween and having one or more quick disconnects for that purpose. Chassis 10 and 12 of FIG. 1 illustrate one example of a situation in which a quick disconnect interconnection is made by physically repositioning the chassis with respect to one another so that the alignment of the male and female members of the quick disconnect determines the ease or difficulty of making the fluid flow interconnection between the chassis.

Unlike quick disconnects which are mounted to flexible hoses and which can be manually aligned relative to one another to assure a secure interconnection therebetween, when one or more quick disconnects is positioned on an electrical chassis for example, the physical alignment between a coupler such as coupler 14 and a nipple such as nipple 16, is dictated by the physical positions of the chassis 10 and 12 to which such quick disconnect members are mounted. However, it is not unusual for the physical position of one or both of two interconnecting electrical chassis to be predetermined by other mechanical limiting means such as physical dimensions of a panel opening or mechanical tracks to which one or both of the electrical chassis is connected. Even in those cases where there are no such physical constraints, if there are more than one fluid flow quick disconnect interconnections mounted on two electrical chassis, such as chasses 10 and 12, there is a substantial likelihood of some degree of misalignment between the coupler and nipple portions of each such quick disconnect relative to the other. This results in a misalignment problem which could preclude interconnection without the benefit of the present invention.

The arrowheads shown adjacent each of the nipples 16 of electrical chassis 12 in FIG. 1 indicates various misalignment directions which could occur and which in fact are likely to occur. Thus for example, quick disconnect nipple 16, seen as the right-most positioned quick disconnect male member shown in FIG. 1 on chassis 12, is shown adjacent an axially directed arrowhead indicating an improperly positioned quick disconnect member along the axis between the nipple and the coupler. On the other hand, the left-most nipple 16a of FIG. 1 is shown adjacent arrowheads which are directed horizontally indicating a radial misalignment in a horizontal direction. Similarly, nipple 16b indicates a radial misalignment in a vertical direction. Nipple 16c is adjacent an arrowhead which illustrates an angular misalignment along a horizontal angle and nipple 16d is shown adjacent an arrowhead indicating an angular misalignment along a vertical angle. Any one of these alignment or positioning problems which could occur with respect to any of the quick disconnects shown in FIG. 1, would ordinarily preclude the secure leak-proof interconnection of a coupler 14 and a corresponding nipple 16. It will be seen hereinafter that the present invention is designed to permit the secure leak-proof interconnection of such quick disconnect members despite the presence of all of the aforementioned alignment or position errors in either the female or male member of the quick disconnect. In fact, a preferred embodiment of the present invention is capable of compensating for an angular error of + or −3 degrees, for radial misalignment of + or −0.02 inches, and for an axial misalignment of + or −0.015 inches.

Figure 2:
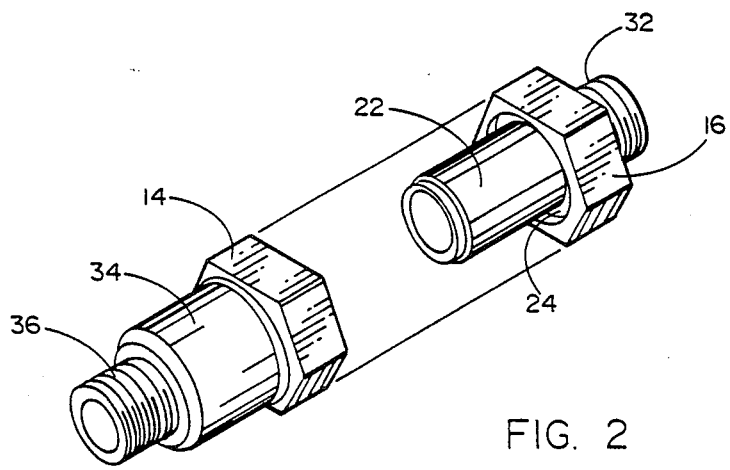
FIG. 2 is an isometric view of the quick disconnect members of the present invention.

FIG. 2 illustrates the exterior components of the male and female members of the quick disconnect of the present invention. More specifically, as seen in FIG. 2 quick disconnect coupler 14 is provided with a body 34 and a threaded member 36 and quick disconnect nipple 16 is provided with a body 22 and a threaded member 32, but further includes a spring seal 24 positioned between the body 22 and the threaded member 32 as will be hereinafter more fully described. The misalignment or axial position compensation capability of the present invention is made possible by spring seal 24 the details of which are more fully shown in FIGS. 3 and 4.

Figure 3:
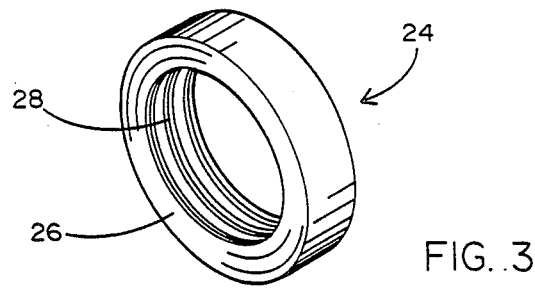
FIG. 3 is an isometric view of a spring seal in accordance with the present invention.
Figure 4:
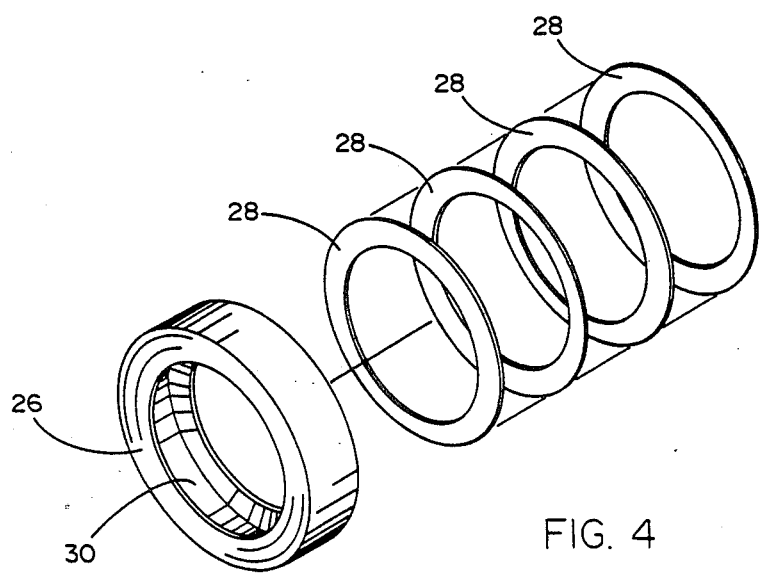
FIG. 4 is an exploded isometric view of the spring seal shown in FIG. 3.

Referring now to FIGS. 3 and 4 it will be seen tha each spring eal 24 comprises a retainer 26 and a plurality of Belleville springs 28. Retainer 26 is an annular member providing an annular pocket 30 along the inner annular edge thereof which pocket is adapted to receive a plurality of Belleville springs 28. In the particular example shown in FIG. 4 there are four such Belleville springs. Retainer 26 is preferably made of a resilient flexible material such as rubber or rubber-like compound which can readily flex and retain its resiliency despite compressive forces engaging the Belleville springs therein along either a portion of or the entire periphery of retainer 26.

Figure 5:
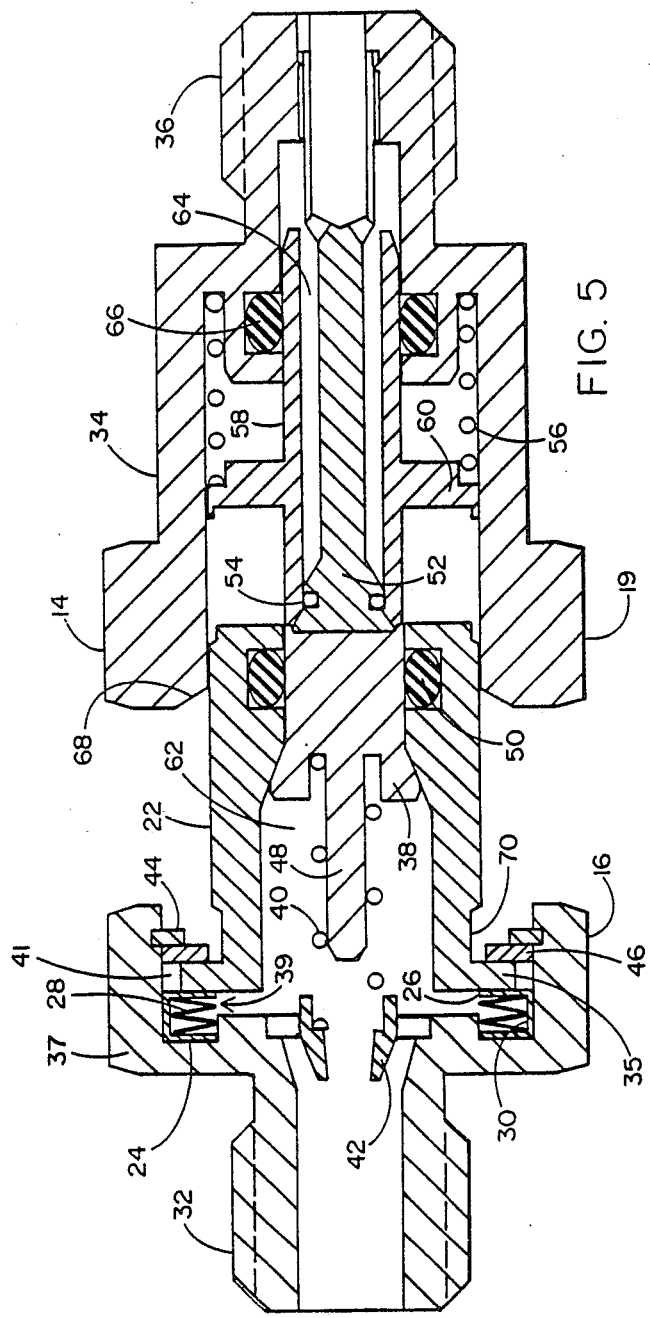
FIGS. 5, 6 and 7 provide cross-sections views of the quick disconnect of the present invention in three different sequential positions as the members thereof are connected relative to one another.
Figure 6:
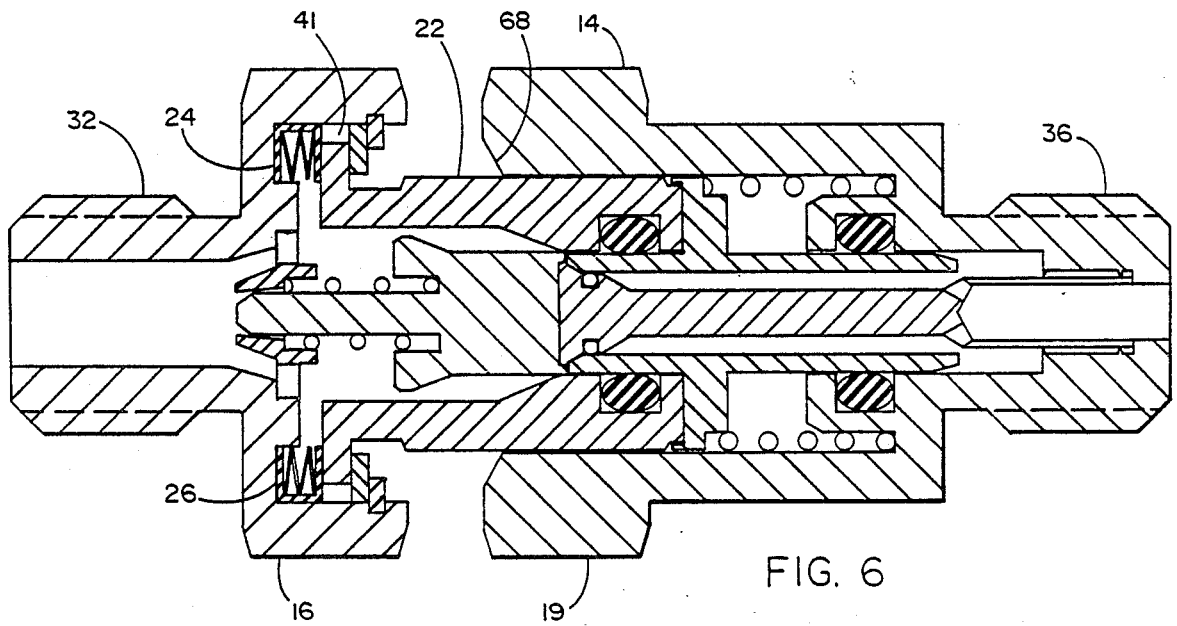
Figure 7:
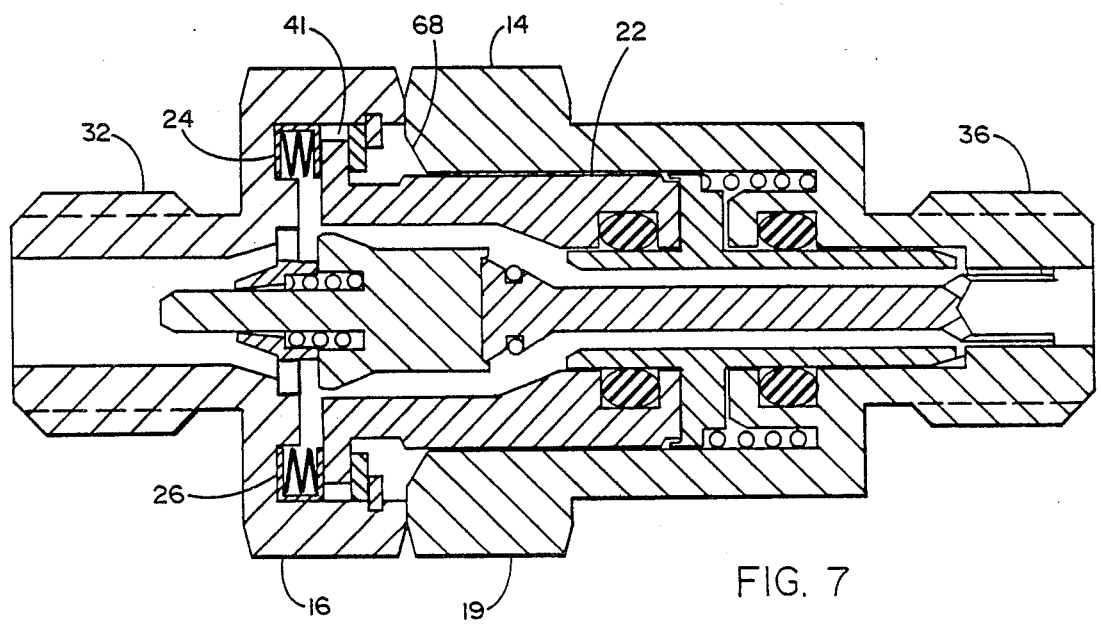

The position of spring seal 24 within the nipple 16 is best understood by referring to FIG. 5, 6 and 7 which also show the sequential interconnection between a typical coupler 14 and nipple 16 of the present invention. It will be seen in FIG. 5 for example that the body 22 of the nipple 16 is provided with a flanged portion 35 and that the threaded member 32 of the nipple 16 is provided with a wrench portion 37 having an interior rectangular cross-section annular chamber 39 for receiving the spring seal 24, the retainer 26 of which is also rectangular in cross-section. The radial edge and one axial edge of retainer 26 is positioned in relatively fixed abutting relationship with the walls of annular chamber 39 while the second radial edge of retainer 26 is free to slideably engage the flanged portion 35 of nipple body 22. A snap ring 44 and grommet 46 overlie and retain the coupler facing edge of flange portion 35 so that the body 22 is securely positioned relative to the threaded member 32. It will be seen in FIG. 5, which shows the initial contact portion of the interconnection sequence between the coupler 14 and nipple 16 where there is no form of misalignment between the two members of the quick disconnect, that when the nipple body 22 is accurately aligned along the central axis of the quick disconnect, there is an annular gap between the wrench portion 37 of threaded member 32 and the flange portion 35 of nipple body 22, this gap being identified by reference numeral 41.

Figure 8:
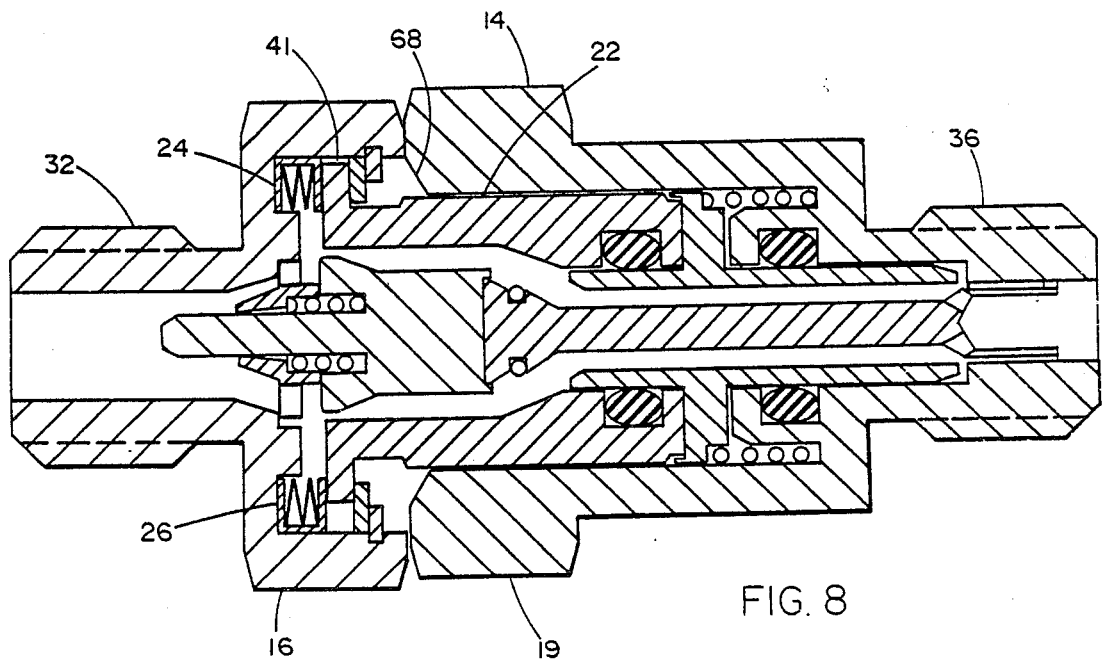
FIGS. 8 and 9 are cross-sectional views similar to that of FIGS. 5-7 but illustrating the interconnection of the quick disconnect of the present invention when there is initial misalignment of the nipple and coupler portions thereof.
Figure 9:
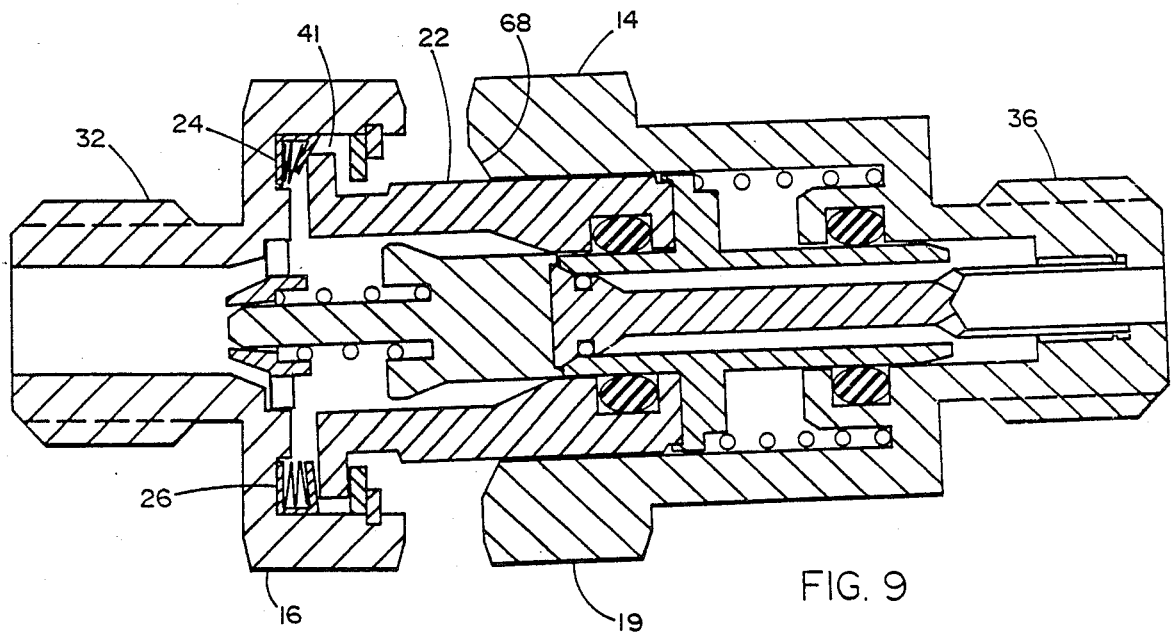

It will also be seen in FIG. 5 that the nipple body 22 is provided with a recessed annular portion 70 in the base region just above the flange 35 and adjacent the grommet 46. The combination of recess 70 and annular gap 41 permits a substantial degree of lateral and angular movement of the nipple body 22 relative to the threaded member 32 of nipple 16. However, because of the interaction of the Belleville springs 28 within the retainer 26, any such radial or angular reorientation of the nipple body 22 within certain limits permits retention of the sealing interaction between the retainer 26 and the flanged portion 35 of nipple 16 thereby preventing any leakage of coolant or other fluid flow between the nipple body 22 and threaded member 32. Two forms of likely misalignment are shown in FIG. 8 and 9, respectively. In FIG. 8 there is radial displacement of the nipple with respect to the coupler and in FIG. 9 there is angular displacement of the nipple with respect to the coupler. In both such instances of misalignment, because of the unique configuration of the spring seal 24 and the floating capability of the nipple body 22, a secure interconnection between quick disconnect members is still accomplished.

The operation of the quick disconnect in all other respects is of a conventional nature and utilizes components of a conventional type all of which are well-known to those having skill in the art to which the present invention pertains. By way of example, nipple 16 also includes a poppet 38, a spring 40, a guide 42, a rod 48 and an O-ring 50. Similarly, coupler 14 provides a stem 52, an O-ring 54, a spring 56, a poppet 58, the latter providing an annular flange 60 against which nipple body 22 bears when the nipple and coupler are interconnected. An O-ring 66 is also provided in the coupler 14. The sequence of interconnection of the nipple and coupler of the present invention is illustrated in FIGS. 5, 6 and 7 and it will be seen that when the two are fully interconnected as shown in FIG. 7, fluid may flow through a nipple channel 62 and a coupler channel 64. Of special note with respect to the coupler 14 is the chamfered edge 68 at the nipple end of a wrench portion 19 thereof. Chamfered edge 68 has the effect of automatically orienting the nipple body 22 particularly when there is some form of misalignment such as radial misalignment shown in FIG. 8 or angular misalignment shown in FIG. 9. In the particular embodiment shown herein, the present invention is capable of providing a leak-proof interconnection between the nipple and coupler even when there is up to + or −3 degrees of angular misalignment, + or −0.02 inches of radial misalignment and + or −0.015 inches of axial misalignment. It is believed that the present invention is the only known quick disconnect capable of providing a leak-proof interconnection between a nipple and a coupler despite having any one or more of these three different forms of misalignment.

It will now be understood that what has been disclosed herein comprises a novel quick disconnect, the nipple portion of which is provided with a unique spring seal comprising a retainer and a plurality of Belleville springs contained within an annular pocket within the retainer. The nipple is provided with a body having a flanged portion which floats on the spring seal relative to an annular chamber within the wrench portion of the threaded member of the nipple. In addition, the wrench portion of the corresponding coupler is chamfered in order to automatically adjust the nipple body despite misalignment of radial, angular and axial type, thereby permitting secure leak-proof interconnection of the quick disconnect members. Such capability is especially useful in accommodating coolant fluid flow through a plurality of serially interconnected electrical chasses wherein misalignment of quick disconnect flow connectors cannot be readily accommodated by manual adjustment means and must be accommodated by automatic adjustment of the quick disconnect components as herein described.

Those having skill in the art to which the present invention pertains will now, as a result of the applicant's teaching herein, perceive various modifications and additions which may be made to the invention. By way of example, other forms of seals which do not use springs or which use springs of a type other than Belleville springs, may be utilized in accordance with the teaching herein to accommodate the automatic adjustment to compensate for misalignment in the manner herein described. However, it will be understood that all such modifications and additions are deemed to be within the scope of the invention which is to be limited only by the claims appended hereto.

I claim:

1. An improved quick disconnect of the type having a female coupler and a male nipple for non-threaded compressively engaged interconnection to permit fluid flow therebetween, the improvement permitting secure leak-proof connection between the coupler and the nipple despite initial misalignment of their respective axes, the improvement comprising:

a nipple providing a wrench portion having an oversize annular chamber and having a nipple body providing a flanged portion positioned for radial, angular and axial movement within said annular chamber; and a seal positioned within said annular chamber between said wrench portion and said flanged portion of said nipple body, said seal having a ring-shaped retainer of resilient flexible material and forming an annular pocket, said seal also having a plurality of Belleville-type springs coaxially positioned within said annular pocket whereby a sealing relationship is provided between said nipple body and said wrench portion despite radial, angular or axial movement of said nipple body to accommodate said initial misalignment.

2. The improvement recited in claim 1 further comprising a coupler having a chamfered radial termination ajacent said nipple body for automatically forcing said body into alignment with said coupler during interconnection of said quick disconnect.

3. The improvement recited in claim 1 wherein said nipple further comprises a snap ring positioned adjacent said flanged portion of said nipple body opposite said seal for retaining said nipple body in contact with said seal despite radial, angular or axial movement of said nipple body during connection of said nipple to said coupler.

4. A nipple for a quick disconnect of the type used for non-threaded compressively engaged interconnection with a coupler, the nipple comprising:

a threaded member having an axial fluid path therethrough;

a cylindrical body; and a seal, the seal being positioned between the threaded member and the body and having a hollow ring-shaped retainer with an inner radial opening forming an annular pocket, said seal also having a plurality of Belleville-type circular springs contained in said annular pocket to prevent fluid leakage between said threaded member and said cylindrical body despite motion of said body relative to said threaded member in radial, angular or axial direction relative to the axis of said threaded member.

5. The nipple recited in claim 4 wherein said retainer is made of a resilient, flexible material.

6. The nipple recited in claim 5 wherein said material is a rubber-like compound.

* * * * *